United States Patent [19]

Löfmark et al.

[11] Patent Number: 5,335,272
[45] Date of Patent: Aug. 2, 1994

[54] METHOD AND ARRANGEMENT FOR SUPPLYING DIRECT CURRENT TO A TELEPHONE LINE

[75] Inventors: Bengt G. Löfmark, Skärholmen; Jan O. H. Oredsson, Solna; Claes J. A. Lindberg, Sollentuna, all of Sweden

[73] Assignee: Telefonaktiebolaget L M Ericsson, Stockholm, Sweden

[21] Appl. No.: 141,378

[22] Filed: Oct. 28, 1993

Related U.S. Application Data

[63] Continuation of Ser. No. 649,030, Feb. 1, 1991, abandoned.

[30] Foreign Application Priority Data

Feb. 1, 1990 [SE] Sweden ................. 9000366

[51] Int. Cl.$^5$ .................................. H04M 1/00
[52] U.S. Cl. .......................... 379/413; 379/399
[58] Field of Search ............. 379/413, 402, 399, 398, 379/387, 390, 394, 395

[56] References Cited

U.S. PATENT DOCUMENTS

| | | | |
|---|---|---|---|
| 4,476,350 | 10/1984 | Aull et al. ............................ | 379/413 |
| 4,563,547 | 1/1986 | Booth .................................. | 379/399 |
| 4,631,359 | 12/1986 | Johansson et al. .................. | 379/413 |

*Primary Examiner*—James L. Dwyer
*Assistant Examiner*—Jack Chiang

*Attorney, Agent, or Firm*—Burns, Doane, Swecker & Mathis

[57] ABSTRACT

The present invention relates to a method and an arrangement for supplying direct current to a telephone line. According to the invention, the current supply characteristic is programmable. The arrangement comprises a direct current supply circuit which detects the line voltage and supplies a line current in accordance with a preprogrammed current supply characteristic. The circuit includes a first more high-voltage part and a second more low-voltage part, in which programming of the current supply characteristic takes place. For the purpose of achieving programming, a first resistive component having a programmable resistance is arranged essentially parallel with a capacitor in the second part. The first resistive component determines the supply resistance of the circuit for low line currents. For the purpose of programming the characteristic, the circuit also includes a voltage limiting element having a programmable reference voltage connected in series with a second resistive component having a programmable resistance, which are arranged substantially in parallel with the capacitor. The reference voltage determines a limit line current at which current limitation occurs and the second resistive component determines, together with the first resistive component the supply resistance of the circuit at current limitation. Finally, the polarity of the idling voltage of the circuit is also programmable.

13 Claims, 1 Drawing Sheet

METHOD AND ARRANGEMENT FOR SUPPLYING DIRECT CURRENT TO A TELEPHONE LINE

This application is a continuation of application Ser. No. 07/649,030, filed Feb. 1, 1991, now abandoned.

TECHNICAL FIELD

The present invention relates to the supply of direct current to a telephone line in a telecommunication system. More particularly, but not exclusively, the invention relates to a method and an arrangement for varying the current supply characteristic within the framework of a given pattern by programming.

PRIOR ART

In a telephone exchange, a SLIC-circuit (Subscriber Line Interface Circuit) is responsible, among other things, for supplying direct current to the telephone line and its subscriber, corresponding to the SLIC-circuit. Current supply is achieved in the SLIC--circuit with the aid of an electronic control system, which detects the line voltage and delivers a corresponding line current. In this way it is possible to imitate the function of a conventional, resistively supplied system, although constant current supply can also be achieved. The supply resistance, and therewith also the supply current, can be determined through the selection of external resistors. The current supply function of a SLIC-circuit of known kind is found described in Ericsson Review No. 4, 1983.

Also belonging to the known technology is the line circuit BIMOS Line Interface Circuit (BLIC) found described in IEEE Journal of Solid-State Circuits, Vol Sc-21, No. 2, April 1986 pages 252-258. The line circuit includes a DC-loop operative to supply direct current to a corresponding telephone line. The line circuit (BLIC) operates in the opposite manner to the aforesaid SLIC-circuit, since it senses line current and supplies line voltage.

Also known to the prior art is a feedback loop for the supply of direct current in a MALC-system. This system is described in MOTOROLA, Technical Developments, Volume 7, October 1987, pages 77-79. The supply characteristics illustrated in FIG. 1 can be divided into three parts, voltage supply $V_L = V_F$, current supply $I_L = I_F$ and resistive supply, said circuit being similar to a current source having an internal resistance $R_F$. FIG. 2 illustrates the circuit with which the supply characteristic illustrated in FIG. 1 is obtained. The parameters $V_F$, $R_F$ and $I_F$ are programmable. The circuit produces a constant voltage $V_L = V_F$, since the circuit includes a transconductance amplifier OTA, so that very high voltage amplification is achieved.

DISCLOSURE OF THE INVENTION

The primary drawback with the SLIC-circuit is that the supply characteristic cannot be programmed. Consequently, when delivering SLIC-circuits to different countries, it is necessary to produce different circuits for countries in which different requirements of current supply characteristics prevail. The circuits are different, inter alia, because a resistor, which is connected externally, varies.

A further drawback with the SLIC-circuit is that the equivalent inductance of the circuit is not constant when the current supply resistance varies. This means that the reaction times of the current supply loop are dependent on the current supply characteristic and can be unfavorably long in certain instances.

The problem with the d.c. supply feedback loop of the MALC-system resides in the configuration of the current supply characteristic. At constant line voltage, $V_L = V_F$ in FIG. 1, infinite amplification is required, which in turn makes it difficult to maintain a stable DC-loop. At constant current, $I_L = I_F$ in FIG. 1, problems can occur together with subscriber equipment with current limitation. If current limitation in the subscriber equipment occurs at the same current as the current limitation in the DC-loop, low-frequency self-oscillation can occur.

Accordingly, the object of the present invention is to provide a direct current supply circuit which detects line voltage and supplies line current, and the current supply characteristic of which is suitable for supplying direct current to the subscriber line, while enabling the current supply to be varied by programming.

A further object of the invention is to provide a current supply circuit having short reaction times, so that the circuit is able to react quickly to a change in line voltage, by changing the line current in a corresponding manner.

The desired functions of the direct current supply are obtained with the inventive method and the inventive current supply circuit. The circuit includes a voltage converter for detection and level-adjustment of the line voltage, a lowpass filter which comprises a capacitor and intended to filter-off speech signals, a buffer amplifier connected to the lowpass filter, and a resistor connected to the output of said amplifier. The output voltage from the buffer amplifier delivers current through the resistor to a current amplifier, which supplies the actual line current.

Programming of the current supply characteristic is achieved by arranging a first resistive component having a programmable resistance substantially in parallel with the capacitor in the lowpass filter. For the same purpose, a voltage limiting element having a programmable reference voltage is also connected in series with a second resistive component having a programmable resistance, which are arranged substantially parallel with said capacitor. Finally, a current generator is also arranged substantially in parallel with the capacitor. The generator generates a current having a programmable direction and optionally also a programmable magnitude. Thus, all changes in the current supply characteristic are effected by shunt coupling of the capacitor in the lowpass filter. The circuit hereby supplies the line current in accordance with a predetermined current supply characteristic.

The current supply characteristic according to the present invention includes four programmable parameters. The first of these parameters is the supply resistance to low line currents, the second is an interruption point at which current limitation occurs, the third is the supply resistance of the circuit at current limitation and the fourth is the open circuit voltage of the circuit, wherein the polarity of the idling voltage can be programmed and optionally also its size. Thus, these four parameters are programmed with the aid of said programmable components. Because all changes in the current supply characteristic are effected as a shunt coupling of the capacitor included in the lowpass filter, the equivalent inductance of the current supply circuit, seen from the line side, will be constant, independently of both the current supply characteristic and the operation point. The advantage afforded by the constant inductance is that the reaction time of the current supply loop will be short. A constant inductance is obtained because the amplification-bandwidth-product in the current supply circuit becomes constant when shunt coupling the capacitor.

The advantage afforded when the current supply characteristic can be programmed is that one and the same circuit can be manufactured for different countries in which different requirements on the current supply characteristic prevail. The desired current supply characteristic can then be programmed, for instance in conjunction with an operational start.

The inventive current supply characteristic has advantages over the characteristic in the MALC-system. The inventive circuit does not generate a constant line voltage and consequently does not have infinite amplification, therewith avoiding stability problems. Instead, there is used in accordance with the invention a negative resistance wherewith a sufficiently low current supply resistance is generated for the voltage drop to be practically negligible. For the purpose of avoiding the aforesaid problem associated with constant current supply, the current supply will always have a resistive character, even with current limitation. Furthermore, the responsiveness to tolerances in the components is smaller compared with the d.c. supply circuit of the MALC-system. This is because the inventive circuit, in a fundamental state, in which the first and the second resistive components are infinitely large, has a d.c. voltage amplification through the lowpass filter and buffer amplifier which is identical to one, whereas corresponding amplification in the realization with the transconductance amplifier is determined by the quotient between two resistances and is thus determined by the tolerances thereof.

BRIEF DESCRIPTION OF THE DRAWINGS

The inventive method and arrangement will now be described in more detail with reference to an exemplifying embodiment thereof and with reference to the accompanying drawings in which.

BEST MODE OF CARRYING OUT THE INVENTION

Figure 1:
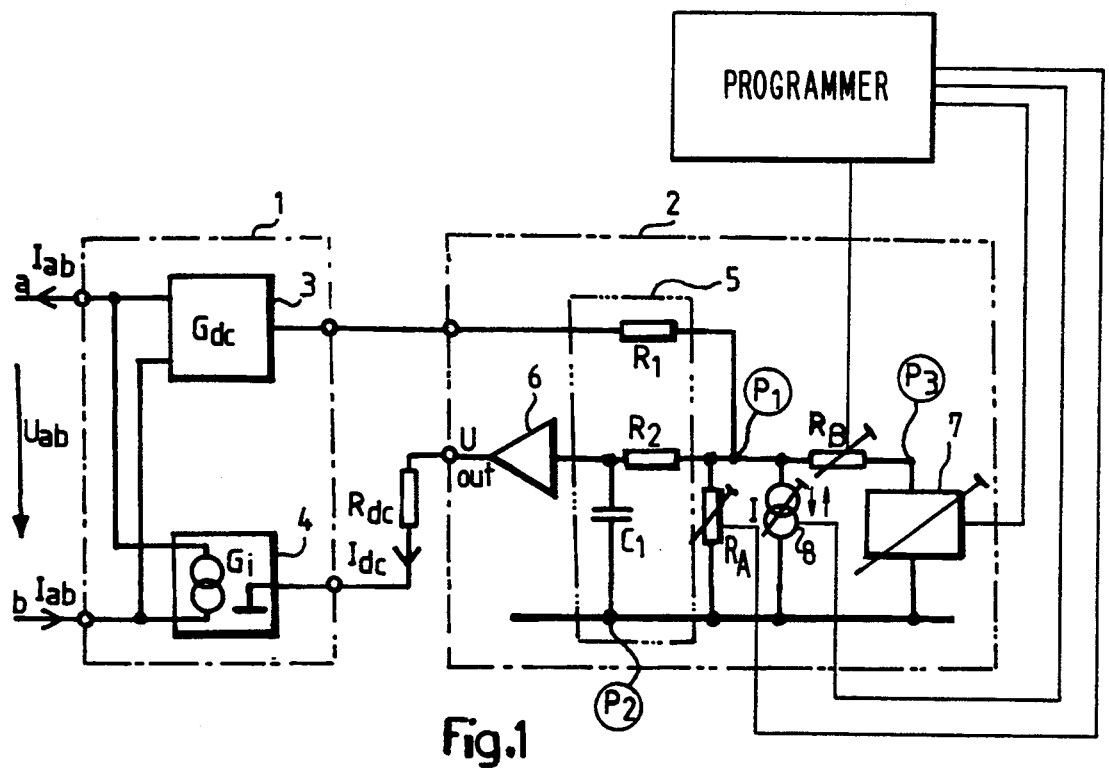
FIG. 1 illustrates an inventive current supply circuit and FIG. 2 illustrates the supply characteristic of the current supply circuit.

FIG. 1 illustrates the inventive direct current supply circuit. This circuit is connected to a telephone line ab for supplying direct current thereto, said circuit detecting the line voltage $U_{ab}$ and, via a feedback loop, supplying corresponding line current $I_{ab}$ in accordance with a preprogrammed direct current supply characteristic.

The circuit includes a more high-voltage part 1 and a second more low-voltage part 2, in which programming of the current supply characteristic takes place. A voltage converter 3 in the more high-voltage part 1 is connected to the telephone line ab for the purpose of detecting line voltage $U_{ab}$. The line voltage $U_{ab}$ is adapted in the voltage converter 3 to a lower voltage level capable of being handled in the more low-voltage part 2, in which programming of the current supply characteristic takes place. The voltage converter 3 delivers across its output to the low-voltage part a voltage which corresponds to the line voltage multiplied by a conversion factor $G_{dc}$ which is much smaller than one. The output voltage $U_{out}$ from said more low-voltage part supplies current $I_{dc}$ to a current amplifier 4, via a resistor $R_{dc}$, which amplifies the current $I_{dc}$ with a factor $G_i$ and supplies the actual line current $I_{ab}$. The voltage converter 3 and the current amplifier 4 in the more high-voltage part 1 are included in the aforementioned SLIC-circuit.

The more low-voltage part includes a lowpass filter 5 comprising an RC-circuit. The function of the lowpass filter is to block signals at speech frequency. The lowpass filter 5 includes a first and a second resistor $R_1$, $R_2$ and a capacitor $C_1$. The second resistor $R_2$ is much more low-ohmic than the first resistor $R_1$ and may optionally be zero ohm. One terminal of the first resistor $R_1$ is connected to the output of the voltage converter 3 and the other terminal is connected to one terminal of the second resistor $R_2$. One terminal of the capacitor $C_1$ is connected to the other terminal of the second resistor $R_2$. Also connected to this latter terminal is the input of a buffer amplifier 6. The output of the buffer amplifier 6 is connected to said resistor $R_{dc}$. The function of the buffer amplifier 6 is to form a buffer between the more low-voltage part 2 and the resistor $R_{dc}$, so that said resistor will not be loaded to a greater extent than the more low-voltage part 2. As beforementioned, the output voltage $U_{out}$ from the buffer amplifier 6 supplies current to the current amplifier 4, through the resistor $R_{dc}$. The more low-voltage part 2 forms, together with the resistor $R_{dc}$ said feedback loop.

All influence of the current supply characteristic takes place between a first node $P_1$ between the first and the second resistor $R_1$, $R_2$, and a second node $P_2$ at the other connection of the capacitor $C_1$, i.e. substantially parallel with said capacitor. Four components are responsible for variation of the current supply characteristic, these components being a first resistive component $R_A$ having programmable resistance, a second resistive component $R_B$ having programmable resistance, a voltage limiting element 7 having a programmable reference voltage, and a current circuit 8 which generates a generator current I in a programmable direction or sense, and optionally also a programmable magnitude. The first resistive component $R_A$ is connected between said first and second nodes $P_1$, $P_2$. The second resistive component $R_B$ is connected between said first node $P_1$ and the one connection of the voltage limiting element 7. The other connection on the voltage limiting element is connected to the second node $P_2$. Referring once more to the second resistor $R_2$ in the lowpass filter, the purpose of this resistor is to attenuate noise and interference that can occur in the voltage limiting element 7, and in other respects has no influence on the current supply characteristic. The current circuit 8 is connected between said first and said second nodes $P_1$, $P_2$, in order to generate said generator current I which determines the open circuit voltage E of the current supply circuit. The voltage E is a function of said current I, the first resistor $R_1$ in the lowpass filter 5 and the conversion factor $G_{dc}$ in the voltage converter 3, $E = I \cdot R_1 / G_{dc}$. The current direction determines the polarity of the voltage.

Figure 2:
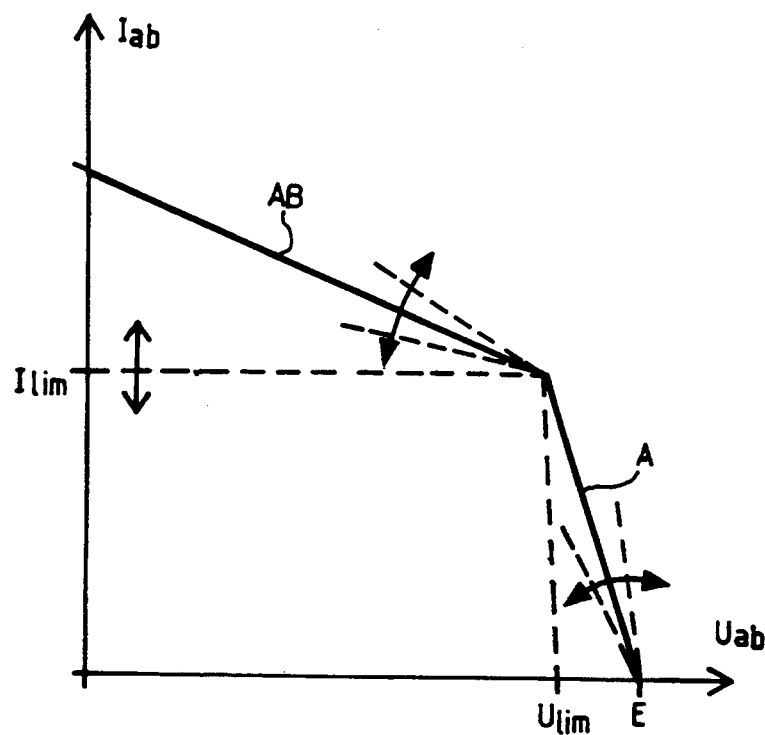

FIG. 2 illustrates the current supply characteristic which can be obtained with the described circuit. The Figure also indicates how the characteristic can be changed with the aid of the earlier mentioned programmable components in the low-voltage part 2 of the current supply circuit.

The current supply characteristic in FIG. 2 shows the line current $I_{ab}$ as a function of the line voltage $U_{ab}$. The appearance of the characteristic depends on the supply resistance $R_{feed}$ of the current supply circuit (internal resistance) which can be varied by varying the aforesaid variable parameters. Thus, the line current $I_{ab}$ is a function of the circuit supply resistance $R_{feed}$ and of the line voltage $U_{ab}$, $I_{ab}=(R_{feed}, U_{ab})$. In order to enable the circuit to be understood more readily, it can be said to be in a fundamental state with respect to the supply resistance when the first and the second resistive components $R_A$, $R_B$ are very high-ohmic, i.e. the lines which connect these components are considered as being clipped. When in the fundamental state, the supply resistance is determined by the conversion factor $G_{dc}$, the current amplification factor G. and the resistance $R_{dc}$, $R_{feed}=R_{dc}/(G_i \cdot G_{dc})$. Referring back to FIG. 1, in which the resistive components $R_A$, $R_B$ have resistance values which can be used in practice, so that these will also determine the circuit supply resistance. The characteristic exhibits two mutually connected lines, a first line A and a second line AB. The lines A, AB illustrate that the circuit has different supply resistance, depending on the line voltage $U_{ab}$, by the fact that the magnitude of the supply resistance is corresponded by the slope of the lines and by the fact that the lines shown in the Figure have different slopes.

The circuit supply resistance $R_{feed}$ to line currents $I_{ab}$ smaller than a limit line current $I_{lim}$ is determined by the first resistive component $R_A R_{feed} = R_{dc} \cdot (1+R_1/R_A)/(G_i \cdot G_{dc})$. (The circuit supply resistance also includes the supply resistance in the fundamental state, although this is ignored because it is constant.) In FIG. 2, the slope of the first line A denotes the circuit supply resistance for the lower current region $I_{ab} < I_{lim}$. The size of the slope is corresponded by the inverted value of the supply resistance, wherein a large slope (almost vertical) will thus indicate low-ohmic supply resistance. In its simplest form, the first resistive component $R_A$ is a resistor. The current supply to the telephone line ab will be more high-ohmic than in the fundamental state. This resistance can be given different values, by program control. In the illustrated embodiment, the resistive component $R_A$ is a string of silicon-integrated resistances, where the desired resistance is obtained with the aid of transistors. As beforementioned, different values give different supply resistances and therewith impart different slopes to the first line A. If the first resistive component $R_A$ is low-ohmic, the supply resistance will be high-ohmic and the first line A will have a gentler or small slope, whereas if the component $R_A$ is high-ohmic, the supply resistance will be low-ohmic and the line A will have a steep or large slope. It is also possible to achieve a more low-ohmic supply (the line A is almost perpendicular) by forming the first resistive component $R_A$ from a negative resistance, generated with the aid of a resistor in combination with a positive or negative feedback amplifier. The resistor is connected between the input and the output of the feedback amplifier. Different values of the negative resistance are obtained by varying the amplifier feedback, which can also be program controlled. The limit line current $I_{lim}$ is corresponded by a limit voltage $U_{lim}$. Thus, the circuit supply resistance is controlled between the open circuit voltage E and said limit voltage $U_{lim}$ by the first resistive component $R_A$.

The voltage limiting element 7 functions to limit current at line currents which are higher than the limit current $I_{lim}$, so that the line current $I_{ab}$ in said upper current interval will increase at a slower rate than in the lower current interval. The voltage limiting element 7 consists, for instance, of a negative feedback comparator, the reference voltage of which, which is program controlled, determines the limit current $I_{lim}$ at which current limitation occurs. The reference voltage can be programmed, by applying a programmable current to a resistor. When the voltage on the comparator input, at a third node $P_3$ inbetween the second resistive component $R_B$ and the voltage limiter 7, reaches the programmed reference voltage, the voltage is unable to increase further, but instead passes a current through the comparator. This current passing through the comparator also flows through the second resistive component $R_B$, which therewith also determines the circuit supply resistance, which therewith increases so that said current limitation occurs. The first resistive component $R_A$ parallel with the second resistive component $R_B$ determines the supply resistance of the circuit at said current limitation, i.e. at line currents which exceed the limit current $I_{lim}$. The decrease in the slope of the second line AB in FIG. 2 shows that the circuit supply resistance will increase with current limitation. The second resistive component $R_B$ can be varied by programming, so that the slope of the line AB, and thereby the supply resistance of the current at current limitation, is varied. The aforesaid second component $R_B$ may comprise, for instance, the same type of component as that used for the first resistive component $R_A$, when this is positive.

Since the current supply circuit includes a lowpass filter 5, the internal impedance in the circuit becomes complex. The impedance consists of the earlier mentioned supply resistance $R_{feed}$ in series with an inductance $L_{feed}$. The reactive element in the lowpass filter is a capacitor $C_1$. The first resistive component $R_A$ is a linear shunt to said capacitor, whereas the second resistive component $R_B$ is a non-linear shunt to the same capacitor. Since all changes in the current supply characteristic, both linear and non-linear, are reflected by shunt-coupling of this capacitor, the equivalent inductance, seen from the line side ab, will be constant, independently of both current supply characteristic and operation point. This is achieved because the product of the amplification and bandwidth in the circuit is constant at said shunt coupling to the capacitor.

That the impedance includes an inductance is due to the fact that the circuit between the line ab and the two first nodes $P_1$, $P_2$ can be considered as a gyrator which transforms current to voltage and vice versa. A current in the section between the nodes $P_1$, $P_2$ will thus correspond to a voltage on the line ab (the generator current I determines the idling voltage E) and a voltage corresponds to a line current $I_{ab}$ (the voltage limiting element 7 results in current limitation on the line ab). A shunt-connected resistance therewith transforms to a series resistance on the kine and, in the same way, the parallel capacitance $C_1$ is transformed to a series inductance $L_{feed}$.

We claim:

1. A device for supplying a first direct current to a 2-wire telephone line comprising:
    a voltage converter electrically connected to detect and control a first voltage level across said telephone line and having an output to provide a reduced voltage level corresponding to said first voltage level;

a low-pass filter to substantially filter-out speech signals from said telephone line, said low-pass filter having an input and an output, said low-pass filter comprising a resistive section and a capacitive section, said resistive section including a first resistive element, said capacitive section including a capacitive element and a second resistive element, and said low-pass filter input being electrically connected to said voltage converter output;

a current generator electrically connected in parallel relation with said capacitive section and having an output to provide a selectable current wherein said selectable current determines an open circuit voltage across said telephone line;

a first adjustable resistor electrically connected in relation with said capacitive section wherein a supply resistance of said device across said telephone line is determine by said first adjustable resistor when said first current has a value less than a limit line current value;

an adjustable voltage limiter electrically connected in series relation with a second adjustable resistor, said series connected adjustable voltage limiter and second adjustable resistor being in parallel relation with said capacitive section, said voltage limiter having an adjustable output value wherein said output value determines the limit line current value at which to allow limitation of said first current, said supply resistance of said device across said telephone line being determined by said second adjustable resistor when said first current has a value greater than said line limit current value;

a buffer amplifier electrically connected to said low-pass filter output and having an output to provide a second voltage;

a buffer output resistor electrically connected to said buffer amplifier output to provide a second current corresponding to said second voltage; and a current amplifier electrically connected to receive said second current and having an output electrically connected to supply said first current to said telephone line.

2. The device of claim 1 wherein said selectable current is selectable by program control.

3. The device of claim 1 wherein said first adjustable resistor, said second adjustable resistor and said adjustable voltage limiter are adjustable by program control.

4. The device of claim 1 wherein said adjustable voltage limiter is a feedback comparator.

5. The device of claim 1 wherein a magnitude of said current generator output is adjustable.

6. The device of claim 5 wherein the magnitude of said current generator output is adjustable by program control.

7. The device of claim 1 wherein said first adjustable resistor comprises a resistance element electrically connected with a feedback amplifier to form a negative resistance.

8. A method of controlling a current supply in a circuit for supplying a first direct current to a 2-wire telephone line comprising the steps of:

detecting and controlling a first voltage level across said telephone line;

filtering-out speech signals form said telephone line through a low-pass filter comprising a resistive section and a capacitive section, said resistive section including a first resistive element, said capacitive section including a capacitive element and a resistive element to provide a filtered signal;

generating a second current corresponding to said filtered signal;

amplifying said second current to provide said first current;

generating a third current, said third current being selectable, and electrically connecting said third current in shunt relation with said capacitive section wherein said third current determines an open circuit voltage across said telephone line;

controlling a supply resistance of said circuit across said telephone line when said first current has a value less than a limit line current value by a first adjustable resistor electrically connected in shunt relation with said capacitive section; and controlling the supply resistance of said circuit across said telephone line when said first current has a value greater than said limit line current value by electrically connecting an adjustable voltage limiter in series relation with a second adjustable resistor, and said adjustable voltage limiter and said second adjustable resistor being further connected in shunt relation with said capacitive section, wherein said supply resistance of said circuit across said telephone line is determined by said second adjustable resistor, and wherein said limit line current value at which limitation of said first current is allowed is determined by an output voltage level of said adjustable voltage limiter.

9. The method of claim 8 wherein said third current is selectable by program control.

10. The method of claim 8 wherein said first adjustable resistor and said second adjustable resistor are adjustable by program control.

11. The method of claim 8 further comprising the step of selecting said third current, adjusting said first adjustable resistor, adjusting the output voltage level of said adjustable voltage limiter and adjusting said second adjustable resistor to control said first current.

12. The method of claim 8 wherein a magnitude of said third current is adjustable.

13. The method of claim 12 wherein a magnitude of said third current is adjustable by program control.

* * * * *